United States Patent [19]

Clements

[11] 4,084,673
[45] Apr. 18, 1978

[54] ROTARY POWER TRANSMISSION DEVICES

[75] Inventor: Herbert Arthur Clements, Weybridge, England

[73] Assignee: S.S.S. Patents Limited, London, England

[21] Appl. No.: 745,901

[22] Filed: Nov. 29, 1976

[30] Foreign Application Priority Data

Dec. 1, 1975 United Kingdom ............... 49281/75

[51] Int. Cl.² .............................................. F16D 23/10
[52] U.S. Cl. .................................. 192/67 A; 192/48.92
[58] Field of Search ........................... 192/48.92, 67 A

[56] References Cited
U.S. PATENT DOCUMENTS

| | | | |
|---|---|---|---|
| 3,358,800 | 12/1967 | Clements | 192/67 A |
| 3,899,060 | 8/1975 | Clements | 192/67 A |

Primary Examiner—Allan D. Herrmann
Attorney, Agent, or Firm—Woodcock, Washburn, Kurtz & Mackiewicz

[57] ABSTRACT

A synchronous self-shifting toothed clutch comprises a first rotary clutch part carrying first and second rings of clutch teeth, a first intermediate member carrying a third ring of clutch teeth and a second intermediate member carrying a fourth ring of clutch teeth, the first intermediate member being mounted on a second rotary clutch part via interengaged helical splines of one hand and the second intermediate member being mounted on the second clutch part via interengaged splines of the other hand.

When the first and second rotary clutch parts pass through synchronism in one direction of relative rotation the first and third rings of clutch teeth interengage to establish a first power path through the clutch and the second and fourth rings of clutch teeth interengage to establish a second power path through the clutch, and the two intermediate members react on one another so that the load is shared between the two power paths.

4 Claims, 4 Drawing Figures

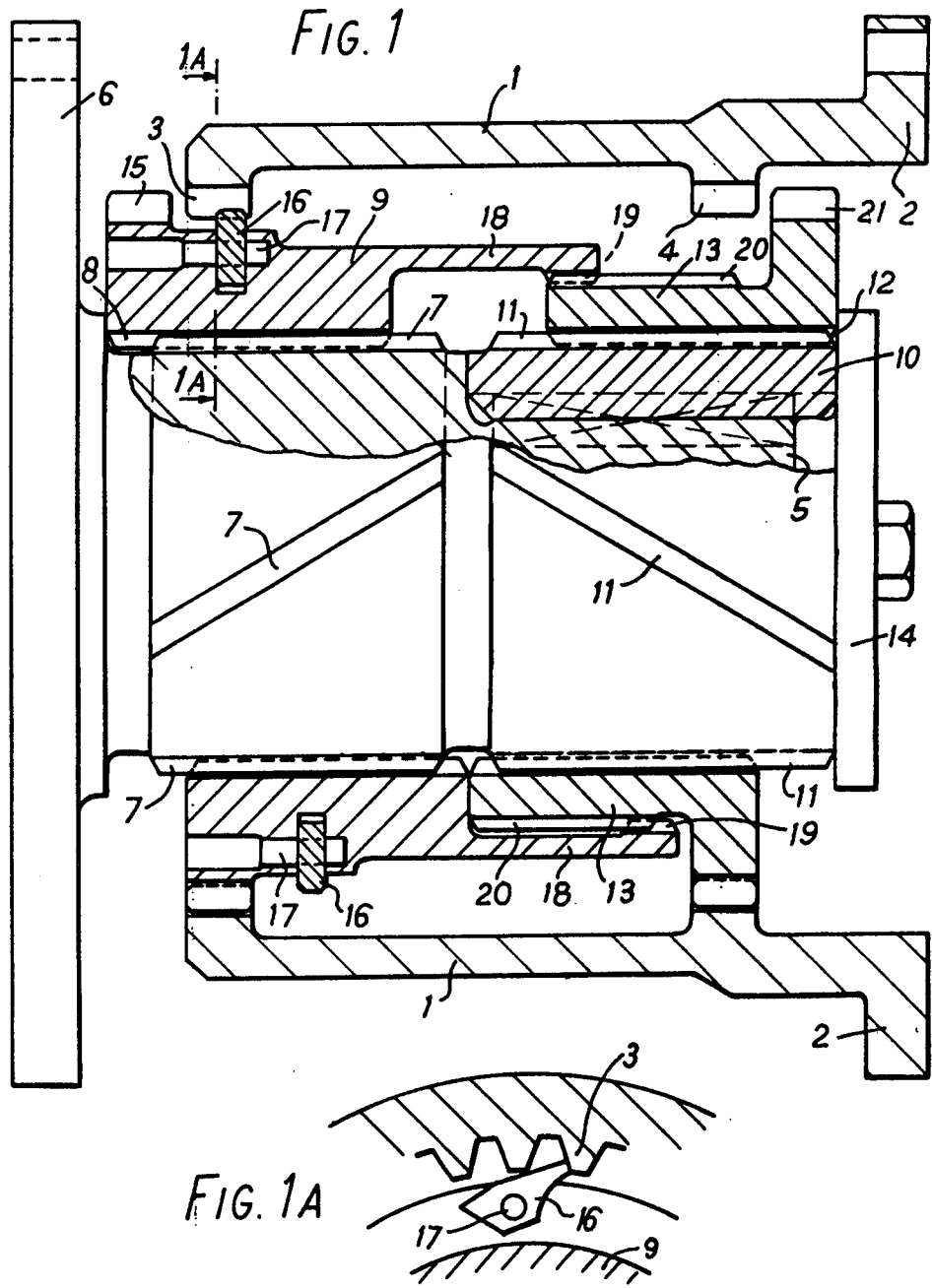

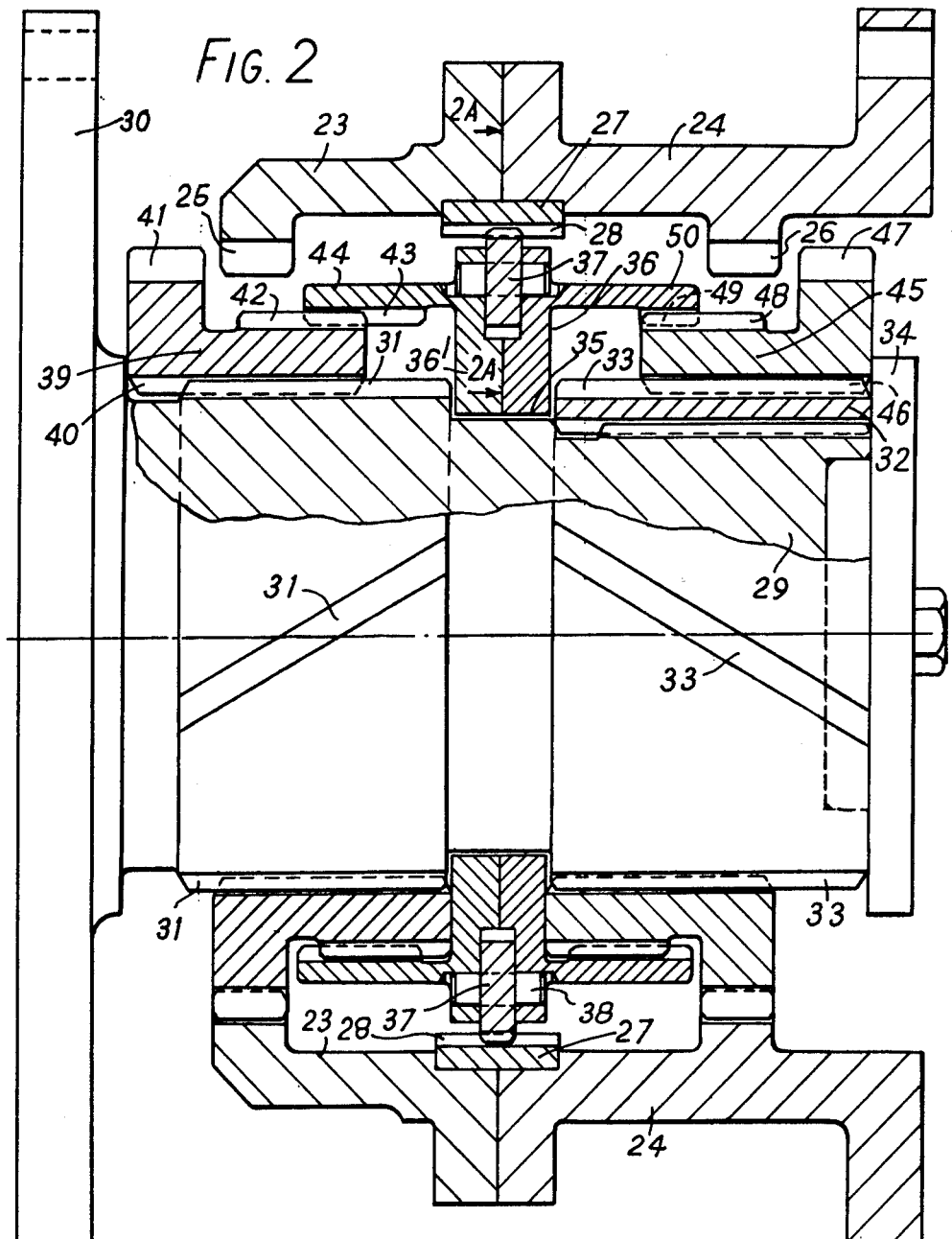
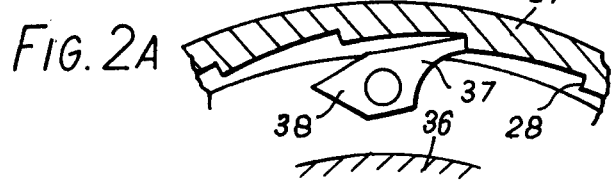

ROTARY POWER TRANSMISSION DEVICES

This invention relates to synchronous self-shifting toothed clutches of the type comprising first and second rotary clutch parts, and clutch actuating mechanism which includes intermediate means constrained for movement relative to said second rotary clutch part, and means, e.g. pawl and ratchet mechanism, operative upon passage of said first and second rotary clutch parts through synchronism in one direction of relative rotation to shift said intermediate means in the requisite direction relative to said second rotary clutch part to initiate interengagement of the co-acting clutch teeth.

A clutch of the above type, when designed for high power and high speeds, needs to be of large dimensions, and a point will be reached at which the centrifugal stresses in the large diameter components of the clutch are unacceptably high. The problem then arises of increasing the load-carrying capacity of the clutch without increasing its overall diameter. The object of the present invention is to solve this problem.

In accordance with the invention there is provided a synchronous self-shifting toothed clutch comprising first and second rotary clutch parts, first and second rings of clutch teeth carried by said first rotary clutch part, first intermediate means constrained for movement relative to said second rotary clutch part and carrying a third ring of clutch teeth, second intermediate means constrained for movement relative to said second rotary clutch part and carrying a fourth ring of clutch teeth, and means operative upon passage of said first and second rotary clutch parts through synchronism in one direction of relative rotation to shift said first intermediate means in the direction to initiate interengagement of said first and third rings of clutch teeth whereby to establish a first power path between said first and second rotary clutch parts and conjointly to shift said second intermediate means in the direction to initiate interengagement of said second and fourth rings of clutch teeth whereby to establish a second power path between said first and second rotary clutch parts, the said first power path including helical driving surfaces and the said second power path also including helical driving surfaces, the two intermediate means being arranged when the clutch is engaged to react on one another, such that the load is shared between said first and second power paths.

Embodiments of the invention will now be described by way of example with reference to the accompanying drawings, in which FIG. 1 is a view in longitudinal section on the axis of a synchronous self-shifting toothed clutch in accordance with one embodiment of the invention, the upper half of the Figure showing the clutch in a disengaged condition and the lower half of the Figure showing the clutch in the engaged condition, and FIG. 1 A is a sectional part view on the line 1A — 1A of FIG. 1.

FIG. 2 is a view in longitudinal section on the axis of a synchronous self-shifting toothed clutch in accordance with another embodiment of the invention, the upper half of the Figure showing the clutch in a disengaged condition and the lower half of the Figure showing the clutch in an engaged condition, and FIG. 2A is a sectional part view on the line 2A — 2A of FIG. 2.

The clutch illustrated in FIGS. 1 and 1A includes a first rotary clutch part constituted by a sleeve 1 which has a radially outwardly projecting annular flange 2 which can be bolted to a shaft. The sleeve 1 is formed with two axially spaced rings of straight internal clutch teeth 3 and 4 which constitute respectively the first and second rings of clutch teeth referred to above. The second rotary clutch part includes a stub shaft 5 which is formed at the left-hand end with a radially outwardly projecting annular flange 6 which can be bolted to another shaft. Over a major part of half the length — the left-hand half as seen in FIG. 1 — the stub shaft 5 is formed with external left-hand helical splines 7 with which are engaged internal helical splines 8 of a first intermediate member comprising a sleeve 9 which constitutes the above-mentioned first intermediate means. Over a major part of the right-hand half as seen in FIG. 1 the stub shaft 5 is of reduced diameter and carries on this part a sleeve 10 which is rigidly secured thereto and is formed with external right-hand helical splines 11 with which are engaged internal helical splines 12 of a second intermediate member, comprising a sleeve 13 which constitutes the above-mentioned second intermediate means. The sleeve 10 is held in place by a stop member 14 bolted to the stub shaft 5.

The first intermediate member 9 carries a ring of straight external clutch teeth 15, which constitutes the third ring of clutch teeth referred to above. It also carries pawls 16 which are mounted on pawl pins 17, and has a cylindrical extension 18 which is formed with a ring of internal teeth 19 which are interengaged with long external teeth 20 formed on the second intermediate member 13. The second intermediate member 13 is formed with a ring of straight external clutch teeth 21 which constitutes the fourth ring of clutch teeth referred to above.

As seen in FIG. 1, in the disengaged condition of the clutch the first intermediate member 9 is in a left-hand end position on the stub shaft 5, in which it is against an axial stop constituted by the flange 6, and the third ring of clutch teeth 15 is to the left of the first ring of clutch teeth 3. The pawls 16 are in an axial position in which they can ratchet relative to the internal clutch teeth 3 or engage with them according to the direction of relative rotation of the first and second rotary clutch parts 1 and 5. The second intermediate member 13 is in a right-hand end position on the stub shaft 5 in which it is against an axial stop constituted by the stop member 14, the fourth ring of clutch teeth 21 being to the right of the second ring of clutch teeth 4.

As seen from the left-hand end of the clutch and as shown in FIG. 1a, the noses of the pawls 16 point in clock-wise direction such that when the first rotary clutch part 1 is rotating in clockwise direction relative to the second rotary clutch part 5 the clutch teeth 3 ratchet over the noses of the pawls 16 and the clutch overruns. When the second rotary clutch part 5 is accelerated in the clock-wise direction and tends to overrun the first rotary clutch part 1, upon passage of the first and second rotary clutch parts 1 and 5 through synchronism pawls 16 engage clutch teeth 3 and the first intermediate member 9 is thereby shifted helically to the right along the left-hand splines 7 relative to the second rotary clutch part 5 to initiate interengagement of the third ring of clutch teeth 15 with the first ring of clutch teeth 3. Conjointly with this movement of the first intermediate member 9 the second intermediate member 13 is shifted to the left along the right-hand splines 11 under the action of the interengaged teeth 19 and 20, whereby to initiate the interengagement of the second and fourth rings of clutch teeth 4 and 21.

The interaction of the partially interengaged first and third rings of clutch teeth 3 and 15 then shifts the first intermediate member 9 further to the right, and the interaction of the partially interengaged second and fourth rings of clutch teeth 4 and 21 shifts the second intermediate member 13 further to the left. When the first and third rings of clutch teeth 3 and 15 are fully interengaged and the second and fourth rings of clutch teeth 4 and 21 are fully interengaged, the first and second intermediate members 9 and 13 are in end-to-end contact, as shown in the lower half of FIG. 1, the first intermediate member 9 serving as an axial stop for limiting the movement of the second intermediate member 13 to the left and the second intermediate member 13 serving as an axial stop for limiting the movement of the first intermediate member 9 to the right.

The interengagement of the first and third rings of clutch teeth 3 and 15 establishes a first power path between the first rotary clutch part 1 and the second rotary clutch part 5. The interengagement of the second and fourth rings of clutch teeth 4 and 21 establishes a second power path between the first rotary clutch part 1 and the second rotary clutch part 5. Owing to the interaction of the helical working surfaces of the splines, 7, 8 and 11, 12, the first and second intermediate members 9 and 13 react on one another such that the load on the clutch is distributed between the said two power paths. This ability of the clutch to share load between two power paths makes the clutch particularly suitable for use in the transmission of high powers at high speed without increasing the diameters of the rotary components of the clutch to the extent that the centrifugal stresses in them are undesirably high.

When the direction of relative rotation of the first and second rotary clutch parts 1 and 5 reverses, the interaction of the clutch teeth 3, 15 and 4, 21, the interengaged teeth 19 and 20 and the helical splines 7, 8 and 11, 12, causes the two intermediate members 9 and 13 to shift back to the positions shown in the upper half of FIG. 1.

In a modification (not shown) of the embodiment described above the splines 7, 8 and 11, 12, may be straight, the clutch teeth 3, 15 and 4, 21, having helical working surfaces and the pawls 16 also having helical working surfaces. In a further modification all of the said working surfaces may be helical, the inclination of the working surfaces of the clutch teeth 3, 15 and 4, 21, and the pawls 16 to the clutch axis being suitably different from the inclination of the working surfaces of the splines 7, 8, and 11, 12, to the clutch axis.

In the embodiment of the invention illustrated in FIGS. 2 and 2A, the first rotary clutch part comprises two sleeves 23 and 24 which are bolted together. The sleeve 23 is formed with a ring of straight internal clutch teeth 25 that constitute the first ring of clutch teeth, and the sleeve 24 is formed with a flange which can be bolted to a shaft, and with a ring of straight internal clutch teeth 26 that constitute the second ring of clutch teeth. The sleeves 23 and 24 are shaped so as to provide between them an internal annular groove which accommodates a ring 27, formed with internal ratchet teeth 28, clamped rigidly therein, as is required, in precise angular relationship to the internal clutch teeth 25 and 26.

The second rotary clutch part is constituted by a stub shaft 29 formed with a flange 30 which can be bolted to a shaft. The left-hand part of the stub shaft 29 is formed with external left-hand helical splines 31, and the right-hand part of the stub shaft 29 has splined to it a sleeve 32 which is formed with external right-hand helical splines 33, the sleeve 32 being held in place by a stop member 34 bolted to the stub shaft 29. The central part of the stub shaft 29 has an external annular groove 35 in which is accommodated a ring formed in two parts 36, 36' clamped together by bolts (not shown) and carrying pawls 37 mounted on pawl pins 38. As is shown there is clearance between the radially inner periphery of the ring 36, 36' and the base of the groove 35, and there is also clearance between the sides of the ring 36, 36', and the sides of the groove 35.

A first intermediate member constituting the said first intermediate means, comprises a sleeve 39 which is formed with internal helical splines 40, which are engaged with the external helical splines 31 of the second rotary clutch part 29. The first intermediate member 39 is also formed with a ring of external clutch teeth 41, constituting the third ring of clutch teeth, and with straight external splines 42 with which are engaged internal splines 43 on a ring 44 integral with the ring part 36'. A second intermediate member constituting the second intermediate means, comprises a sleeve 45 which is formed with internal helical splines 46 which are engaged with the external helical splines 33 of the second rotary clutch part 29. The second intermediate member 45 is also formed with a ring of straight external clutch teeth 47 constituting the fourth ring of clutch teeth and with straight external splines 48 with which are engaged internal splines 49 in a ring 50 integral with the ring part 36.

In the disengaged condition of the clutch, shown in the upper half of FIG. 2, the first intermediate member 39 is in a left-hand position in which it is against an axial stop constituted by the flange 30, and the third ring of clutch teeth 41 is to the left of the first ring of clutch teeth 25. The second intermediate member 45 is in a right-hand end position in which it is against an axial stop constituted by the stop member 34, and the fourth ring of clutch teeth 47 is to the right of the second ring of clutch teeth 26.

As seen from the left-hand end of the clutch in FIG. 2 and as shown in FIG. 2A, the noses of the pawls 37 point in clockwise direction, such that if the first rotary clutch part, 23, 24, is rotating in clockwise direction relative to the second rotary clutch member 29 the internal ratchet teeth 28 ratchet over the noses of the pawls 37, and the clutch overruns. When the second rotary clutch part 29 is accelerated in clockwise direction and tends to overrun the first rotary clutch part 24, pawls 37 engage ratchet teeth 28 and the ring 36, 36' is rotated in anti-clockwise direction relative to the second rotary clutch part 29. Owing to the interaction of the interengaged left-hand helical splines 42 and 43 the said relative movement of the ring 36, 36' causes the first intermediate member 39 to shift helically to the right relative to the second rotary clutch part 29, whereby to initiate interengagement of the first and third rings of clutch teeth 25 and 41, and owing to the action of the interengaged right-hand helical splines 48 and 49 the said relative movement of the ring 36, 36' causes the second intermediate member 45 to shift helically to the left relative to the second rotary clutch part 29, whereby to initiate interengagement of the second and fourth rings of clutch teeth 26 and 47. The interaction of the partially interengaged rings of clutch teeth 25 and 41 then causes the first intermediate member 39 to shift further to the right to bring the first and third rings of clutch teeth into full interengagement, whereby to establish a first power path between the first and second rotary clutch members 23, 24 and 29. The interaction of the partially interengaged second and fourth rings of clutch teeth 26 and 47 causes the second intermediate member 45 to shift further to the left to bring the second and fourth rings of clutch teeth 26 and 47 into full interengagement. The intermediate member 39 is then against the ring part 36', and the intermediate member 45 is against the ring part 36, so that due to the interaction of the helical driving surfaces of the splines 31, 40, and 33, 46, and the floating arrangement of the ring 36, 36', resulting from the above-mentioned clearances the intermediate members 39 and 45 react on one another such that the load is shared between the said two power paths.

Desirably, the working surfaces of the clutch teeth and of the splines 42, 43 and 48, 49, are so related as regards their inclinations to the clutch axis that during the interengagement of the clutch teeth there is imparted to the ring 36 a rotation relative to the first rotary clutch part 24 such that the pawls 34 are moved out of engagement with the ratchet teeth 28 and are thereby relieved of load.

I claim:

1. A synchronous self-shifting toothed clutch of the type comprising first and second rotary clutch parts, co-acting clutch teeth, intermediate means constrained for movement relative to said second rotary clutch part, and clutch actuating means operative upon passage of said first and second rotary clutch parts through synchronism in one direction of relative rotation to shift said intermediate means relative to said second rotary clutch part in the requisite direction to intitiate interengagement of the co-acting clutch teeth, with the improvements comprising first and second rings of clutch teeth carried by said first rotary clutch part, first intermediate means constrained for movement relative to said second rotary clutch part, a third ring of clutch teeth carried by said first intermediate means, a second intermediate means constrained for movement relative to said second rotary clutch part, a fourth ring of clutch teeth carried by said second intermediate means, said clutch actuating means operative upon passage of said first and second rotary clutch parts through synchronism in one direction of relative rotation to shift said first intermediate means in the requisite direction to initiate interengagement of said first and third rings of clutch teeth whereby to establish a first power path between said first and second rotary clutch parts and conjointly to shift said second intermediate means in the requisite direction to intitiate interengagement of said second and fourth rings of clutch teeth whereby to establish a second power path between said first and second rotary clutch parts, said first and second power paths each including helical driving surfaces and said first and second intermediate means, in the engaged condition of the clutch, reacting on one another such that the load is shared between said first and second power paths.

2. A synchronous self-shifting clutch according to claim 1 comprising interengaged helical splines of one hand for constraining said first intermediate means for helical movement relative to said second rotary clutch part, and interengaged helical splines of the other hand for constraining said second intermediate means for helical movement relative to said second rotary clutch part.

3. A synchronous self-shifting toothed clutch according to claim 1 wherein said first and second intermediate means react directly on one another in the engaged condition of the clutch.

4. A synchronous self-shifting toothed clutch according to claim 1, wherein said first and second intermediate means react on one another via a floating clutch part in the engaged condition of the clutch.

* * * * *